US012609020B2

(12) United States Patent
Wolf et al.

(10) Patent No.: US 12,609,020 B2
(45) Date of Patent: Apr. 21, 2026

(54) SYSTEM FUNCTIONALITY SETTINGS BASED ON A PERSON OF INTEREST IN AN EVENT DETECTION SYSTEM

(71) Applicant: Honeywell International Inc.,
Charlotte, NC (US)

(72) Inventors: Benjamin H. Wolf, Leicester (GB);
Christopher Dearden, Melton
Mowbray (GB); Michael Barson,
Nuneaton (GB)

(73) Assignee: Honeywell International Inc.,
Charlotte, NC (US)

( * ) Notice: Subject to any disclaimer, the term of this
patent is extended or adjusted under 35
U.S.C. 154(b) by 17 days.

(21) Appl. No.: 18/642,026

(22) Filed: Apr. 22, 2024

(65) Prior Publication Data

US 2025/0329246 A1     Oct. 23, 2025

(51) Int. Cl.
*G08B 21/22*        (2006.01)
*G08B 25/00*        (2006.01)
*H04W 4/021*        (2018.01)

(52) U.S. Cl.
CPC ........... *G08B 21/22* (2013.01); *G08B 25/008*
(2013.01); *H04W 4/021* (2013.01)

(58) Field of Classification Search
CPC ............ A61B 1/00006; A61B 1/00009; A61B
1/00013; A61B 1/0005; A61B 1/015;
A61B 1/04; A61B 1/045; A61B 1/317;
A61B 17/00234; A61B 17/1604; A61B
18/148; A61B 18/1482; A61B 18/1492;
A61B 18/22; A61B 2017/00367; A61B
2017/1602; A61B 2018/00577; A61B
2018/00589; A61B 2018/00595; A61B
2018/00601; A61B 2018/00607; A61B
2018/00642; A61B 2018/00702; A61B
2018/00744; A61B 2018/00982;
(Continued)

(56) References Cited

U.S. PATENT DOCUMENTS 9,558,602 B1 *   1/2017  Straz .................. G07C 9/00896
10,991,213 B2 *  4/2021  Sloo .................... G01N 27/121
(Continued)

FOREIGN PATENT DOCUMENTS

CN      111462458       7/2020
CN      113473377       10/2021
WO      2017117674 A1   7/2017

OTHER PUBLICATIONS

Huh "An Indoor Location-Based Control System Using Bluetooth
Beacons for IoT Systems," Sensors, 2017.

*Primary Examiner* — Daniel Previl
(74) *Attorney, Agent, or Firm* — Brooks, Cameron &
Huebsch, PLLC

(57)            ABSTRACT

Devices, systems, and methods for system functionality
settings based on a person of interest in an event detection
system are described herein. In some examples, one or more
embodiments include a memory and a processor to execute
instructions stored in the memory to receive a person of
interest signal indicating a location of a person of interest in
a facility, and in response to receiving the person of interest
signal, modify a system functionality setting of an event
device in the predefined detection zone in which the location
of the person of interest is located based on an attribute
included in a user profile included in the person of interest
signal.

20 Claims, 5 Drawing Sheets

(58) Field of Classification Search
CPC ........ A61B 2018/167; A61B 2090/309; A61B
2217/005; A61B 2217/007; A61B
2218/002; A61B 2218/007; A61B
2218/008; A61B 34/25; A61B 90/30;
A61B 90/36; A61M 13/003; A61M
13/006; A61M 2202/0007; A61M
2202/0225; A61M 2205/3334; A61M
2205/3344; A61M 2205/502; A61M
2205/587; A61M 2205/6072; G05D
16/2066; G05D 7/0676; G06T
2207/10016; G06T 2207/10024; G06T
2207/10068; G06T 2207/10152; G06T
2207/20081; G06T 2207/20084; G06T
2207/30004; G06T 2207/30008; G06T
2207/30028; G06T 2207/30061; G06T
2207/30092; G06T 2207/30168; G06T
7/0002; G06T 7/0012; G16H 15/00;
G16H 30/20; G16H 30/40; G16H 50/20;
H04N 23/52; H04N 23/555; H04N 23/56;
H04N 23/61; H04N 23/74; H04N 7/183;
H04N 7/185; G06Q 50/265; G06Q
90/205; G08B 17/00; G08B 21/22; G08B
25/008; G08B 25/14; G08B 29/18; G08B
7/06; G08B 7/066; H04W 4/021
USPC ... 340/573.4, 680, 683, 686.1, 691.3, 691.6,
340/693.11, 3.1, 3.21, 825.28, 825.29,
340/5.32, 5.2, 5.7, 5.71, 7.63, 825.49
See application file for complete search history.

(56) References Cited

U.S. PATENT DOCUMENTS

| | | | |
|---|---|---|---|
| 2005/0110632 A1 | 5/2005 | Berezowski et al. | |
| 2009/0174989 A1* | 7/2009 | Nagel | H04W 4/02 |
| | | | 361/679.01 |
| 2011/0195782 A1* | 8/2011 | Mao | A63F 13/25 |
| | | | 463/37 |
| 2015/0116107 A1 | 4/2015 | Fadell et al. | |
| 2015/0135206 A1* | 5/2015 | Reisman | H04H 20/93 |
| | | | 725/18 |
| 2017/0041524 A1* | 2/2017 | Schoenen | H04N 5/2256 |
| 2017/0122613 A1 | 5/2017 | Sinha et al. | |
| 2018/0025616 A1 | 1/2018 | Lin et al. | |
| 2019/0020978 A1 | 1/2019 | Finschi et al. | |
| 2020/0218210 A1* | 7/2020 | Deshpande | G05B 15/02 |
| 2021/0091971 A1 | 3/2021 | Keohane et al. | |
| 2022/0108622 A1 | 4/2022 | Derickson et al. | |

* cited by examiner

SYSTEM FUNCTIONALITY SETTINGS BASED ON A PERSON OF INTEREST IN AN EVENT DETECTION SYSTEM

TECHNICAL FIELD

The present disclosure relates to devices, systems, and methods for system functionality settings based on a person of interest in an event detection system.

BACKGROUND

Facilities, such as commercial facilities, office buildings, hospitals, campuses (e.g., including buildings and outdoor spaces), and the like, may have an event detection system that can be triggered during an event, such as an emergency situation (e.g., a fire) to warn occupants to evacuate. Such an event detection system may include an alarm system having a control panel and a number of event devices (e.g., sensors, sounders, pull stations, etc.) located throughout the facility (e.g., on different floors and/or in different rooms of the facility) that can perform an action when an event (e.g., a hazard event, a fault event, etc.) is occurring in the facility. In an example of an event, the number of event devices may provide a notification of the event to the occupants of the facility via alarms and/or other mechanisms.

DETAILED DESCRIPTION

Figure 1:
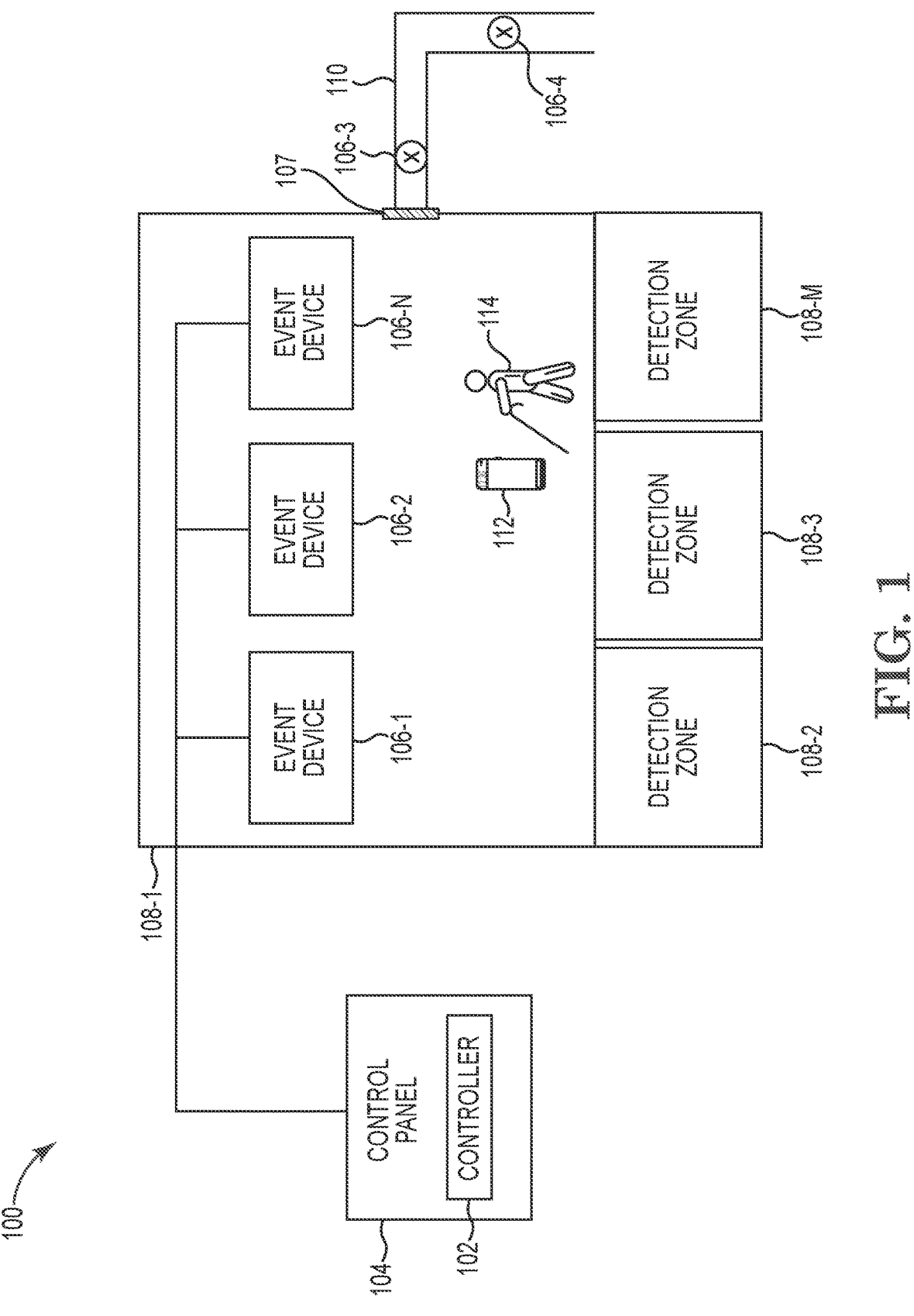
FIG. 1 is an example of a system for system functionality settings based on a person of interest in an event detection system, in accordance with one or more embodiments of the present disclosure.

Devices, systems, and methods for system functionality settings based on a person of interest in an event detection system are described herein. In some examples, one or more embodiments include a memory and a processor to execute instructions stored in the memory to receive a person of interest signal indicating a location of a person of interest in a facility, and in response to receiving the person of interest signal, modify a system functionality setting of an event device in the predefined detection zone in which the location of the person of interest is located based on an attribute included in a user profile included in the person of interest signal.

A facility can utilize an event detection system in order to warn occupants of the facility of an emergency event, such as a fire. An event detection system can be a system of devices that operate to collect information about a facility and provide the collected information for analysis. Such an event detection system can also take actions based on the collected information, such as providing an audible and/or visible warning in an emergency event. For example, the event detection system can utilize event devices to warn occupants of an emergency event occurring in a space, such as a fire. As used herein, the term "event device" refers to a device that can receive an input relating to an event and/or generate an output relating to an event. Such event devices can be a part of the event detection system of a space in a facility/in the facility at large and can include devices such as fire sensors, smoke detectors, heat detectors, carbon monoxide (CO) detectors, or combinations of these; air quality sensors; interfaces; manual call points (MCPs); pull stations; input/output modules; aspirating units; fire doors; and/or audio/visual devices (e.g., speakers, sounders, flashers, buzzers, microphones, cameras, video displays, video screens, etc.), relay output modules, among other types of event devices. Such event devices may also include self-test capabilities.

Certain occupants of the facility may be at higher risk of injury or death in an emergency event than other occupants. For instance, in some examples, persons of interest may include occupants that have a disability, are non-able bodied, or the like that may not be as mobile as other occupants which are not disabled, are able bodied, etc. A vulnerable person can be, for example, a person who has a physical and/or mental impairment that limits one or more life activities. In an emergency event, such vulnerable persons may not evacuate the facility as quickly as non-vulnerable persons, resulting in a higher risk of injury or death to the vulnerable persons from the emergency event. However, in some examples, persons of interest may include persons that a facility may be interested in location tracking in the facility. Such persons of interest may include day to day occupants, site visitors, loan workers, etc.

In examples in which a person of interest is a vulnerable person, current approaches in event detection systems do not distinguish between vulnerable persons and non-vulnerable persons in a facility. While event detection systems may be designed for a facility based on a risk assessment and facility usage and/or type, types of building occupants are not able to be determined at any given time. Accordingly, in an emergency event, vulnerable persons may be at a higher risk of injury or death as compared with non-vulnerable persons in current approaches to event detection systems.

System functionality settings based on a person of interest in an event detection system according to the disclosure can allow for modification of system functionality settings of event devices in the facility based on the presence of a person of interest. The person of interest can be tracked within the facility and system functionality settings of event devices in detection zones where the person of interest is located may be modified. An event can be detected in a detection zone where the person of interest is located before event devices located outside the detection zone may detect the event, allowing for a modified response to the event as compared with events detected outside the detection zone. In examples in which the person of interest is a vulnerable person, the modified response may allow additional time to evacuate the facility for the vulnerable person, reducing the risk of injury or death to the vulnerable person during the emergency event. Such an approach can allow for event detection systems which are safer and more secure as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system for system functionality settings based on a person of interest in an event detection system, in accordance with one or more embodiments of the present disclosure. The system 100 can include a controller 102, a control panel 104, event devices 106-1, 106-2, 106-N, detection zones 108-1, 108-2, 108-3, 108-M, egress route 110, mobile device 112, and person of interest 114.

As mentioned above, the system 100 can be included in a facility, a space in a facility, etc. The system 100 can include a device/series of devices in order to detect events and/or process and/or analyze the detected events to determine whether to generate an alarm for occupants of the facility.

For example, the system 100 can include event devices 106-1, 106-2, 106-N (referred to collectively as event devices 106). The event devices 106 can be devices to detect an event and transmit the detected event for processing and/or analysis. As mentioned above, the event devices 106 can include, for example, cameras, motion sensors, fire sensors, smoke detectors, heat detectors, carbon monoxide (CO) detectors, fixed gas and/or flame detectors, aspirating smoke detectors, beam smoke detectors, or combinations of these; air quality sensors; interfaces; manual call points (MCPs); pull stations; input/output modules; aspirating units; fire doors; sprinkler controls; and/or audio/visual devices (e.g., speakers, microphones, cameras, video displays, video screens, etc.), relay output modules, among other types of event devices. Additionally, event devices 106 may also include self-test capabilities.

The system 100 can further include a control panel 104. The control panel 104 can be utilized to control the various event devices 106 included in the system 100.

The control panel 104 can be connected to the event devices 106, transmit a plurality of commands to the event devices 106, and/or provide power to the event devices 106. The control panel 104 can apply a voltage to an event device loop in order to power event devices 106 on the event device loop. Such power can allow the event devices 106 to perform actions, such as communication between event devices 106 and the control panel 104, self-test procedures, and/or provide an audible and/or visible warning in an emergency event, among other actions.

As illustrated in FIG. 1, the system 100 can include a controller 102. In some examples, as illustrated in FIG. 1, the controller 102 can be located in the control panel 104. However, embodiments of the disclosure are not so limited. For instance, in some examples, the controller 102 may be located externally from the control panel 104 (e.g., and the event detection system altogether), but can be connected to the control panel 104 and/or the event devices 106 via a network relationship. The controller 102 can generate commands to control the event devices 106, such as modifying system functionality settings of the event devices 106 when a person of interest 114 is present, as is further described herein.

As is additionally illustrated in FIG. 1, a person of interest 114 may be located in the facility of the system 100. The person of interest 114 may carry a mobile device 112. As used herein, a mobile device can include devices that are (or can be) carried and/or worn by a user. For example, a mobile device can be a phone (e.g., a smart phone), a tablet, a laptop computer, a personal digital assistant (PDA), smart glasses, a smart lanyard, and/or a wrist-worn device (e.g., a smart watch), among other types of mobile devices.

The mobile device 112 can transmit a person of interest signal. The person of interest signal can be electromagnetic waves generated by a transmitter (e.g., in the mobile device 112) that can include information associated with the person of interest 114.

The person of interest signal can include a user profile associated with the person of interest 114. The user profile can be a collection of settings and information associated with a user of the mobile device 112, where the user can be the person of interest 114. Such settings can include an attribute associated with the person of interest 114 and/or evacuation data associated with the person of interest 114.

For example, the person of interest signal can include the attribute associated with the person of interest 114. The attribute can be a property associated with the person of interest 114 that is stored as a value in a computing file. For example, the attribute can indicate the person of interest 114 is a vulnerable person who has a disability. As another example, the attribute can indicate the person of interest 114 is not a vulnerable person (e.g., a day-to-day occupant, a site visitor, a loan worker, etc.)

Additionally, the person of interest signal can include evacuation data associated with the person of interest 114. Evacuation data can be information that may be useful in planning for evacuation of the person of interest 114. For example, evacuation data can include identification information of the person of interest 114 (e.g., the person of interest's name, birthday, address, etc.), a disability of the person of interest 114 (e.g., if applicable, the person of interest is a vulnerable person 114 who is a quadriplegic), and/or equipment that would assist in evacuation of the person of interest 114 (e.g., a wheelchair). In addition, the person of interest signal may include special identifiers that allow the controller 102 to identify the signal as a person of interest signal.

The event devices 106 can include a beacon and/or a receiver. The person of interest signal can be transmitted by the mobile device 112 and received by a receiver of any one of the event devices 106 via a network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships. Any one of the event devices 106 can include the receiver that can receive the person of interest signal and transmit the person of interest signal to the controller 102 in the control panel 104. Additionally, any one of the event devices 106 can include the beacon that can transmit a location to the mobile device 112.

The controller 102 can receive the person of interest signal from an event device 106. The person of interest signal can indicate a location of a person of a person of interest 114 in the facility, as well as indicate particular information about the person of interest 114 such that different system functionality settings may be modified based on the user profile/attribute associated with the vulnerable person 114, as is further described herein. System functionality settings for a predefined detection zone 108-1 of a plurality of predefined detection zones 108 in the facility in which the mobile device 112 associated with the person of interest 114 may be modified, as is further described herein.

Utilizing the person of interest signal, the controller 102 can determine a location of a mobile device 112 associated with the person of interest 114 in the facility. Based on the location of the mobile device 112 and the attribute included in the user profile included in the person of interest signal, the controller 102 can modify system functionality settings of event devices 106 located in a predefined detection zone 108-1 of a plurality of predefined detection zones 108 in which the mobile device 112 is located. A predefined detection zone 108 can be a software-defined zone that is associated with a physical area in the facility. For example, the predefined detection zone 108-1 may be an office on a first floor of the facility, the predefined detection zone 108-2 may be a conference room on the first floor of the facility, the detection zone 108-3 may be a different office on a second floor of the facility, and the detection zone 108-M may be another different physical area in the facility.

While four predefined detection zones 108-1, 108-2, 108-3, 108-M are illustrated in FIG. 1, embodiments of the disclosure are not so limited. For example, there may be less than four or more than four predefined detection zones 108 in the facility. Further, such predefined detection zones may cover more than one physical area in the facility. For example, one predefined detection zone may cover two offices.

Event devices 106-1, 106-2, 106-N are illustrated in FIG. 1 as being located in the predefined detection zone 108-1. While three event devices 106 are illustrated as being located in the predefined detection zone 108-1, embodiments of the disclosure are not so limited. For example, the predefined detection zone 108-1 may have less than three event devices 106 or more than three event devices 106. Further, although not illustrated in FIG. 1 for clarity, each of the predefined detection zones 108-2, 108-3, 108-M can also include any amount of event devices 106.

As the event devices 106-1, 106-2, 106-M can be known to the controller 102 as being located in the predefined detection zone 108-1, the controller 102 can determine the location of the mobile device 112 associated with the person of interest 114 as being located in the predefined detection zone 108-1. For example, the controller 102 can determine that the person of interest signal was received from event device 106-1, determine the predefined location of the event device 106-1 as being in the predefined detection zone 108-1, and then as a result, determine the mobile device 112 associated with the person of interest 114 is located in the predefined detection zone 108-1.

In some examples, a precise location of the mobile device 112 in the predefined detection zone 108-1 may be determined by the controller 102. For example, the mobile device 112 may be in wireless communication with three of the event devices 106-1, 106-2, 106-N. Signal strengths between the mobile device 112 and the event devices 106-1, 106-2, 106-N may be transmitted to the controller 102 and utilizing the signal strengths, the 102 may triangulate a specific position of the mobile device 112 within the predefined detection zone 108-1.

In some examples, the mobile device 112 may instead determine its location. For example, the mobile device 112 may receive a beacon signal from event detection devices 106-1, 106-2, 106-N that are proximate to the mobile device 112. Utilizing the beacon signals from the event detection devices 106-1, 106-2, 106-N, the mobile device 112 can determine its location in the facility by triangulation based on the beacon signals from the event detection devices 106-1, 106-2, 106-N. In such an instance, the mobile device 112 may include facility map data that can direct the person of interest 114 through the facility (e.g., to a refuge location, on an egress route out of the facility, etc.) Additionally, the location determined by the mobile device 112 can be transmitted to the controller 102.

Further, although location determination of the mobile device 112 is described above as being performed using wireless communication between the mobile device 112 and the event devices 106, embodiments of the disclosure are not so limited. For example, the mobile device 112 may utilize a global positioning system (GPS), cellular network triangulation, and/or other beacon triangulation (e.g., Bluetooth beacons or other beacons) to determine its location and transmit that location information to the controller 102. In other words, while the mobile device 112 is described above as utilizing event devices 106 within the event detection system for location determination, embodiments of the disclosure are not limited to utilizing event devices 106 within the event detection system, as the mobile device 112 may utilize other mechanisms outside of the event detection system to determine its location in the facility.

In addition, the controller 102 can modify system functionality settings of the event devices 106 in the detection zone 108-1 based on the attribute included in the user profile included in the person of interest signal. For instance, in some examples, the controller 102 can modify system functionality settings of the event devices 106 in the detection zone 108-1 in response to the attribute indicating the person of interest 114 is a day-to-day occupant, a site visitor, a loan worker, etc. Additionally, the controller 102 can modify system functionality settings in response to the attribute indicating the person of interest 114 is a vulnerable person.

In response to the attribute indicating the person of interest 114 is a vulnerable person, the controller 102 can modify system functionality settings of the event devices 106 in the detection zone 108-1 from standard alarm settings to heightened alarm settings based on the location of the mobile device 112 being in the detection zone 108-1. System functionality settings can refer to options that can modify operational parameters of a device. The standard alarm settings can be settings for the event devices 106 under normal operating conditions, whereas the heightened alarm settings can be settings for the event devices 106 that cause the event devices 106 to be more sensitive to detection of events as compared with normal operating conditions. The system functionality settings can include sensitivity levels of detectors, time delay between detection of an event and transmitting an event detection signal, coincidence detection settings, disabling actuation of an event device, among other system functionality settings, as is further described herein.

Modifying the system functionality settings can include modifying a sensitivity level of the event devices 106 in the detection zone 108-1. A sensitivity level of the detection devices 106 can be an amount a device's output changes when an input quantity the device measures changes. That is, the sensitivity can be the minimum input of a parameter the device measures that creates a detectable output. For example, modifying the sensitivity level can include increasing the sensitivity level by lowering a detection threshold of the event devices 106 in the detection zone 108-1 such that the event devices 106 detect an event faster than the event devices 106 under standard alarm settings. For instance, under standard alarm settings, the event device 106-1 may have a detection threshold for carbon monoxide detection of 150 parts per million (ppm), whereas under heightened alarm settings, the event device 106-1 may increase the sensitivity level such that the detection threshold for carbon monoxide is 75 ppm. In other words, the detection threshold may be lowered from 150 ppm to 75 ppm for the event device 106-1 when it is determined that the location of the mobile device 112 of the person of interest 114 is located in the detection zone 108-1. Similar system functionality settings may be modified for the event devices 106-2 and 106-N as well, where the event devices 106-2 and 106-N may be the same or different device types (e.g., carbon monoxide detectors, smoke detectors, heat detectors, etc.)

Additionally, modifying the system functionality settings can include removing a predefined time delay between detection of an event by the event devices 106 in the detection zone 108-1 and transmitting an event detection signal by the event device 106 to the control panel 104. For example, under standard alarm settings, the event device 106-1 may have a predefined 20 second time delay between detecting smoke and transmitting an event detection signal to the control panel 104 to cause the control panel 104 to cause the event devices 106 to generate an alarm. Under heightened alarm settings, the event device 106-1 may remove (or reduce) the 20 second predefined time delay such that when the event device 106-1 detects smoke, the event device 106-1 immediately (or per reduced time delay) transmits an event detection signal to the control panel 104. Similar system functionality settings may be modified for the event devices 106-2 and 106-N as well, where the event devices 106-2 and 106-N may be the same or different device types (e.g., carbon monoxide detectors, smoke detectors, heat detectors, etc.)

Further, modifying the system functionality settings can include disabling coincidence detection settings with other event devices 106 in the detection zone 108. Coincidence detection refers to a two-stage alarm activation where if a first event device 106-1 detects a fire, the event device 106-1 goes into a pre-alarm state until and unless a second event device 106-2 detects the fire. Under standard alarm settings, the event device 106-1 may detect a fire in the detection zone 108-1 and go into pre-alarm mode, but a full alarm is not activated until another event device 106-2 detects the fire. Under heightened alarm settings, the event device 106-1 may disable coincidence detection settings with the other event devices 106-2, 106-N in the detection zone 108-1 such that when the event device 106-1 detects the fire, the event device 106-1 immediately transmits an event detection signal to the control panel 104. Similar system functionality settings may be modified for the event devices 106-2 and 106-N as well, where the event devices 106-2 and 106-N may be the same or different device types (e.g., carbon monoxide detectors, smoke detectors, heat detectors, etc.)

As illustrated in FIG. 1, the system 100 can include an egress device 107. The egress device 107 can be a device that assists in egress from the facility. The egress device can be, for example, a fire door, an escalator, an elevator, etc. As illustrated in FIG. 1, the egress device 107 can facilitate movement from the predefined detection zone 108-1 to an egress route 110.

In some examples, the egress device 107 can be a fire door. As used herein, a fire door can be a door with a fire-resistance rating used to reduce the spread of fire and/or smoke between portions of a structure. For example, when a fire event is detected the egress device 107 (e.g., the fire door) may be automatically closed in response to the fire event being detected. However, a vulnerable person of interest 114 may not be able to transit through the fire door in time before the fire door is automatically closed.

Accordingly, modifying the system functionality settings can further include toggling a mechanical action of the egress device 107. Toggling the mechanical action of the egress device 107 can include disabling actuation of the egress device 107 (e.g., the fire door) in response to the location of the mobile device 112 associated with the person of interest 114 being located in the predefined detection zone 108-1 when the fire door is located between the predefined detection zone 108-1 and the egress route 110. For example, the controller 102 can disable, based on the location of the mobile device 112 (e.g., and as such the person of interest 114) being in the detection zone 108-1 and that a fire door (e.g., egress device 107) is located between the detection zone 108-1 and the egress route 110 for detection zone 108-1 (e.g., the mobile device 112/person of interest 114 are located upstream of the fire door and egress route 110), actuation of the fire door. In some examples, the controller 102 can disable the fire door for a predetermined amount of time (e.g., 3 minutes). In some examples, the controller 102 can disable the fire door until a location of the mobile device 112 is detected as being outside of the detection zone 108-1 (e.g., the controller receives a signal from the event detection device 106-3 and determines the mobile device 112 (e.g., and the person of interest 114) are in the egress route 110 and not in the detection zone 108-1). In such examples, the controller 102 can lastly enable actuation and cause the fire door to actuate closed (e.g., after a predetermined amount of time and/or after the mobile device 112 is determined to be outside of the detection zone 108-1).

In some examples, the egress device 107 can be an elevator. As used herein, an elevator can be a platform housed in a shaft to raise or lower people or things to different levels of a facility. When a fire event is detected the egress device 107 (e.g., the elevator) may be automatically disabled in response to the fire event being detected. However, a vulnerable person of interest 114 may not be able to transit out of the detection zone 108-1 via stairs or other mechanisms because of the person of interest 114's vulnerability (e.g., requiring a wheelchair).

Accordingly, modifying the system functionality settings can further include toggling a mechanical action of the egress device 107. Toggling the mechanical action of the egress device 107 can include enabling operation of the egress device 107 (e.g., the elevator) in response to the location of the mobile device 112 associated with the vulnerable person of interest 114 being located in the predefined detection zone 108-1 when the elevator is a means to access the egress route 110 from the predefined detection zone 108-1. For example, the controller 102 can enable operation, based on the location of the mobile device 112 (e.g., and as such the person of interest 114) being in the detection zone 108-1 and that an elevator (e.g., egress device 107) is located between the detection zone 108-1 and the egress route 110 for detection zone 108-1 (e.g., the mobile device 112/person of interest 114 are located upstream of the elevator and egress route 110), of the elevator. In some examples, the controller 102 can enable operation of the elevator for a predetermined amount of time (e.g., 3 minutes) so as to not allow other non-vulnerable persons of interest from using the elevator during the event to prevent such other persons of interest from getting stuck in the elevator. In some examples, the controller 102 can enable operation of the elevator until a location of the mobile device 112 is detected as being outside of the detection zone 108-1 (e.g., the controller receives a signal from the event detection device 106-3 and determines the mobile device 112 (e.g., and the person of interest 114) are in the egress route 110 and not in the detection zone 108-1). In such examples, the controller 102 can lastly disable operation of the elevator (e.g., after a predetermined amount of time and/or after the mobile device 112 is determined to be outside of the detection zone 108-1).

In some examples, the egress device 107 can be an escalator. As used herein, an escalator can be a moving staircase to move (e.g., raise, lower, or horizontally) people or things to different areas or levels of a facility. When a fire event is detected the egress device 107 (e.g., the escalator) may be automatically disabled in response to the fire event being detected. However, a vulnerable person of interest 114 may not be able to transit out of the detection zone 108-1 via stairs or other mechanisms because of the person of interest 114's vulnerability (e.g., requiring a wheelchair).

Accordingly, modifying the system functionality settings can further include toggling a mechanical action of the egress device 107. Toggling the mechanical action of the egress device 107 can include enabling operation of the egress device 107 (e.g., the escalator) in response to the location of the mobile device 112 associated with the vulnerable person of interest 114 being located in the predefined detection zone 108-1 when the escalator is a means to access the egress route 110 from the predefined detection zone 108-1. For example, the controller 102 can enable operation, based on the location of the mobile device 112 (e.g., and as such the person of interest 114) being in the detection zone 108-1 and that an escalator (e.g., egress device 107) is located between the detection zone 108-1 and the egress route 110 for detection zone 108-1 (e.g., the mobile device 112/person of interest 114 are located upstream of the escalator and egress route 110), of the escalator. In some examples, the controller 102 can enable operation of the escalator for a predetermined amount of time (e.g., 3 minutes) so as to not allow other non-vulnerable persons of interest from using the escalator during the event to prevent such other persons of interest from getting stuck on the escalator. In some examples, the controller 102 can enable operation of the elevator until a location of the mobile device 112 is detected as being outside of the detection zone 108-1 (e.g., the controller receives a signal from the event detection device 106-3 and determines the mobile device 112 (e.g., and the person of interest 114) are in the egress route 110 and not in the detection zone 108-1). In such examples, the controller 102 can lastly disable operation of the escalator (e.g., after a predetermined amount of time and/or after the mobile device 112 is determined to be outside of the detection zone 108-1).

Although the egress devices being toggled are described above as including a fire door, escalator, and/or elevator, embodiments of the disclosure are not so limited. For example, the egress devices can be any other mechanical device that may be controlled by the event detection system.

Modifying the system functionality settings can further include modifying a response intensity of the event devices 106 in the detection zone 108-1. An intensity level of the detection devices 106 can be a magnitude of a device's output. For example, modifying the sensitivity level can include decreasing the intensity level by lowering a volume of an audible output of event devices 106 in the detection zone 108-1. For instance, under standard alarm settings, the event device 106-1 may have an audible output volume in response to detection of an event of 120 decibels (dB), whereas under heightened alarm settings, the event device 106-1 may lower the audible output volume such that the audible output volume is 110 dB. In other words, the audible output volume may be lowered from 120 dB to 110 dB for the event device 106-1 when it is determined that the location of the mobile device 112 of the person of interest 114 is located in the detection zone 108-1, as the person of interest 114 may have hypersensitivity. Similar system functionality settings may be modified for the event devices 106-2 and 106-N as well, where the event devices 106-2 and 106-N may be the same or different device types (e.g., carbon monoxide detectors, smoke detectors, heat detectors, etc.).

Similar system functionality settings (e.g., fire doors) may be modified (e.g., actuation disabled) for event devices located in detection zones 108-2, 108-3, 108-M where although not illustrated in FIG. 1 for clarity, detection zones 108-2, 108-3, 108-M can include fire doors separating the detection zones 108-2, 108-3, 108-M.

While event devices 106 located in the detection zone 108-1 are described as having system functionality settings modified as a result of the location of the mobile device 112 associated with the person of interest 114 being located in the detection zone 108-1, embodiments of the present disclosure are not so limited. An egress route can refer to a path to leave the facility. The egress route 110 can further include detection devices 106-3, 106-4.

In response to receiving the person of interest signal, the controller 102 can (in addition to and/or alternatively) modify system functionality settings of event devices 106-3, 106-4 located on an egress route 110 out of the facility from the detection zone 108-1 in which the mobile device 112 of the person of interest 114 is located. For example, as described above, system functionality settings of the event devices 106-3, 106-4 can also be modified from standard alarm settings to heightened alarm settings, and may include modifying sensitivity levels of detectors, time delay between detection of an event and transmitting an event detection signal, coincidence detection settings, disabling actuation of an event device, among other system functionality settings.

In some examples, the controller 102 can determine an egress route from a particular detection zone 108. For example, the controller 102 can determine the egress route 110 from the detection zone 108-1 in response to receiving the vulnerable person signal. In an instance in which an event occurs, the controller 102 can determine whether the event is occurring on or proximate to the egress route 110, and can additionally generate a revised egress route in response to the event occurring on or proximate to the determined egress route 110.

In some examples, the egress route 110 may be a predetermined egress route from the detection zone 108-1. Additionally, in an instance in which an event occurs, the controller 102 can determine whether the event is occurring on or proximate to the egress route 110 that is predetermined, and can additionally generate a revised egress route in response to the event occurring on or proximate to the determined egress route 110.

Modifying system functionality settings of event devices (e.g., located in a detection zone 108-1 in which the mobile device 112 associated with the person of interest 114 is located, and/or in egress routes 110 from the detection zone 108-1) can allow for earlier detection of potential emergency events in the detection zone 108 in which the person of interest 114 is located. Extra time, attention, and/or specialized equipment may be able to be provided to the person of interest 114 to allow for a safer evacuation from the detection zone and/or the facility in the event of an emergency event occurring.

When an event device 106 detects an event under the heightened alarm settings, the controller 102 can generate an alarm in response to an event device 106 detecting an event. In some examples, the alarm can be a staff alarm. For example, upon detecting an event while under the heightened alarm settings, the controller 102 can transmit an alert to a first mobile device (e.g., not illustrated in FIG. 1) of a first person (e.g., a staff member, building occupant, first responder, etc.) to go investigate the detected event.

Additionally, in some examples, the alarm can be a local alarm. A local alarm can be, for example, an alarm initiated in a particular detection zone 108. Upon detecting an event in detection zone 108-1 while under the heightened alarm settings, the controller 102 can initiate a local alarm in the detection zone 108-1. In some examples, the local alarm may include initiating audio/visual alarms in the detection zone 108-1 which detected the event, although embodiments of the disclosure are not limited to localized audio/visual alarms.

Additionally, the controller 102 can transmit an alert to a second mobile device (e.g., not illustrated in FIG. 1) of a second person (e.g., a staff member, building occupant, first responder, etc.), where the second person can travel to the detection zone 108-1 to assist the person of interest 114. The second person can assist the person of interest 114 in the event of a full alarm being generated. For example, the controller 102 can generate a full alarm after a predetermined time delay, if another event device 106-2 detects the event, a combination thereof, etc.

During a day in the facility, the person of interest 114 may move around the facility. Accordingly, the person of interest 114 (e.g., and the mobile device 112) can transit to different detection zones. As the mobile device 112 associated with the person of interest 114 transits from, for example, the detection zone 108-1 to the detection zone 108-2, an event device 106 located in the detection zone 108-2 (e.g., not illustrated in FIG. 1) can receive a further person of interest signal from the event device 106 located in the detection zone 108-2. Similar to the process described above, the event device 106 located in the detection zone 108-2 can transmit the person of interest signal to the controller 102, and the controller 102 can determine (based on the further person of interest signal) a revised location of the mobile device 112 associated with the person of interest 114. The revised location can indicate the mobile device 112 is located in the different predefined detection zone 108-2. The controller 102 can modify the system functionality settings of the event device 106 in the detection zone 108-2 from the standard alarm settings to the heightened alarm settings (e.g., as well as modify the system functionality settings of the event devices 106 in any egress routes associated with the detection zone 108-2, not illustrated in FIG. 1). Further, the controller 102 can modify the system functionality settings of the event devices 106-1, 106-2, 106-N in the detection zone 108-1 from the heightened alarm settings to the standard alarm settings. The event devices 106-1, 106-2, 106-N in the detection zone 108-1 can again operate under standard alarm settings, as the person of interest 114 is no longer located in the detection zone 108-1.

In some examples, the person of interest signal can be emitted from the mobile device 112 at a particular rate. This can result in the person of interest signal being received by the controller 102 at a particular rate.

In an instance in which, for example, the person of interest 114 may forget their mobile device 112 in a detection zone 108-1 for an extended period of time, the controller 102 can modify the system functionality settings for the event devices 106-1, 106-2, 106-N accordingly. For example, the controller 102 can modify the system functionality settings of the event devices 106-1, 106-2, 106-N from the heightened alarm settings to the standard alarm settings in response to an amount of time during which the particular rate at which the person of interest signal is received exceeds a threshold. For instance, if the person of interest signal is continuously received at the particular rate at the controller 102 for over 24 hours (e.g., the threshold being 24 hours), the controller 102 can modify the system functionality settings of the event devices 106-1, 106-2, 106-N from the heightened alarm settings to the standard alarm settings. This can prevent the event devices 106-1, 106-2, 106-N from being set to the heightened alarm settings in an event in which, for instance, the person of interest 114 forgets the mobile device 112 in the detection zone 108 for an extended period of time.

While a mobile device 112 of a person of interest 114 is described above as transmitting a person of interest signal including a user profile having an attribute indicating the person of interest 114 is a vulnerable person, embodiments of the present disclosure are not so limited. For example, other occupants of the facility may include a mobile device which can transmit persons of interest signals to the controller 102, where such persons of interest signals include a user profile having attributes indicating the persons of interest are not vulnerable persons. The controller 102 can track each of the occupants of the facility. For example, the controller 102 can determine the locations of the mobile devices associated with the persons of interest in the facility. Such an approach can further allow for tracking locations of the occupants of the facility, especially when an event occurs. Further, in response to the person of interest signal including a user profile having an attribute indicating a person of interest is not a vulnerable person, the controller 102 can refrain from modifying system functionality settings of event devices 106 in a detection zone 108 from standard alarm settings to heightened alarm settings.

Accordingly, system functionality settings based on a person of interest in an event detection system according to the disclosure can allow for heightened protections for a person of interest in a facility by modifying system functionality settings of event devices in detection zones in which the person of interest (and their associated mobile device) are located. Such an approach can allow for event detection systems to distinguish between persons of interest who are vulnerable persons and persons of interest who are not vulnerable persons in the facility and modify system functionality settings of event devices that are proximate to the vulnerable persons of interests in the facility (e.g., based on a location of a person of interest/their associated mobile device) to reduce the risk of injury or death to persons of interest who are vulnerable persons in an emergency event and increase the safety of the facility as compared with previous approaches.

Figure 2:
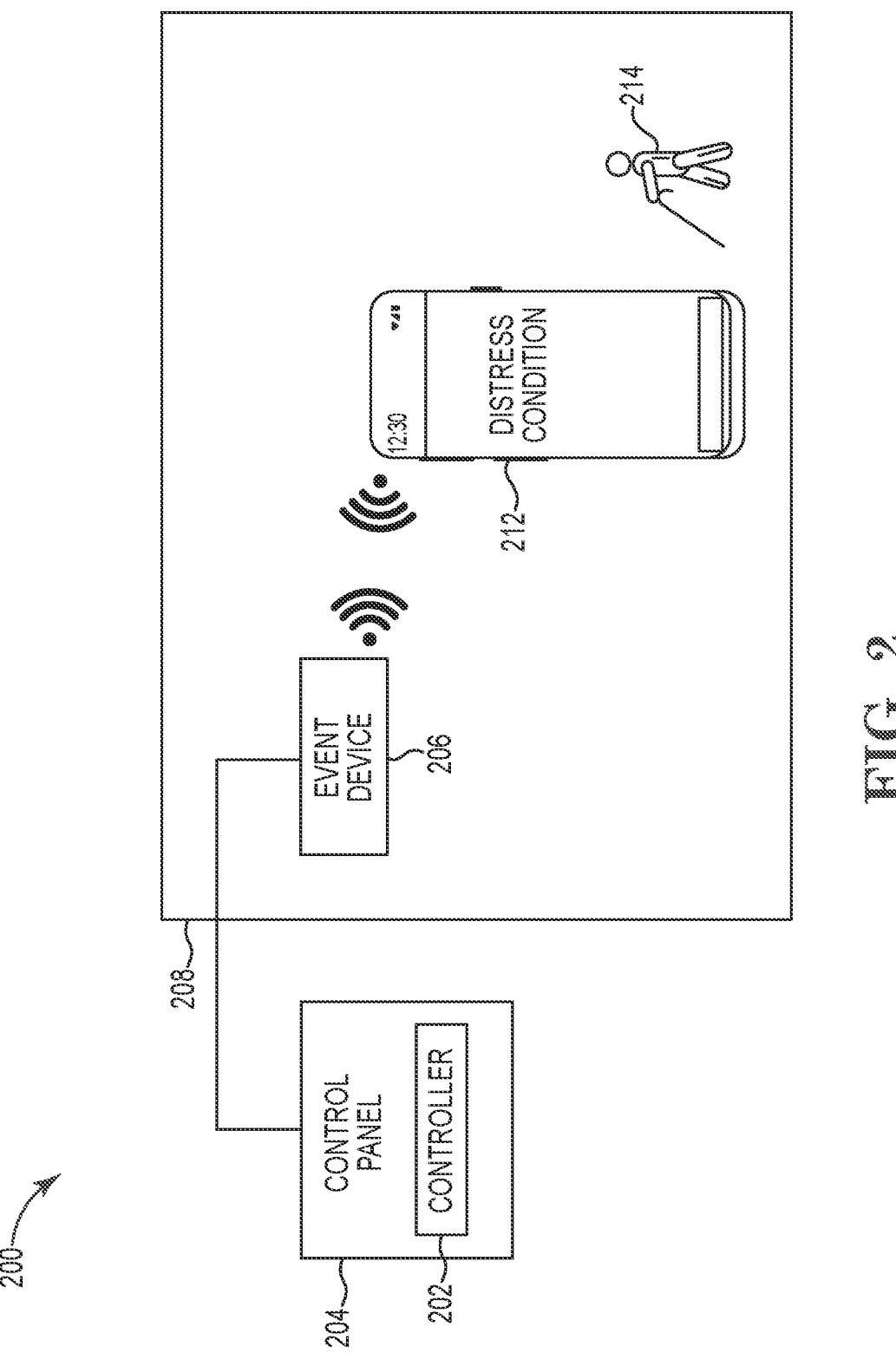
FIG. 2 is an example of transmitting a distress signal for system functionality settings based on a person of interest in an event detection system, in accordance with one or more embodiments of the present disclosure.

FIG. 2 is an example of transmitting a distress signal for system functionality settings based on a person of interest in an event detection system, in accordance with one or more embodiments of the present disclosure. The system 200 can include a controller 202, a control panel 204, an event device 206 located in a detection zone 208, mobile device 212, and person of interest 214.

In some examples, the person of interest 214 may encounter an event in the facility. In some examples, this event may not be detected yet by the event device 206, or in some examples, the event may be a health condition of the person of interest 214. The person of interest 214 may be a person that is unable to effectively convey the occurrence of the event, such as unable to send a message (e.g., via voice, text, etc.), unable to reach a manual call point, etc. In such an example, the person of interest 214 can transmit, via the mobile device 212, a distress signal indicating the person of interest 214 is in a distress condition. The event device 206 can receive the distress signal and transmit the distress signal to the controller 202.

In such an instance, the controller 202 can initiate an alarm. This alarm can be, for instance, a staff alarm, a local alarm, a staff alarm, and/or other types of alarms. Accordingly, the person of interest 214 can be attended to.

In some examples, the distress signal may be transmitted to the controller 202 in response to the event device 206 being in a heightened alarm state (e.g., as a result of the mobile device 212 associated with the person of interest 214 being located in the detection zone 208). However, embodiments of the disclosure are not so limited. For example, the distress signal may be transmitted to the controller 202 even if the event device 206 is in a normal alarm state.

Figure 3:
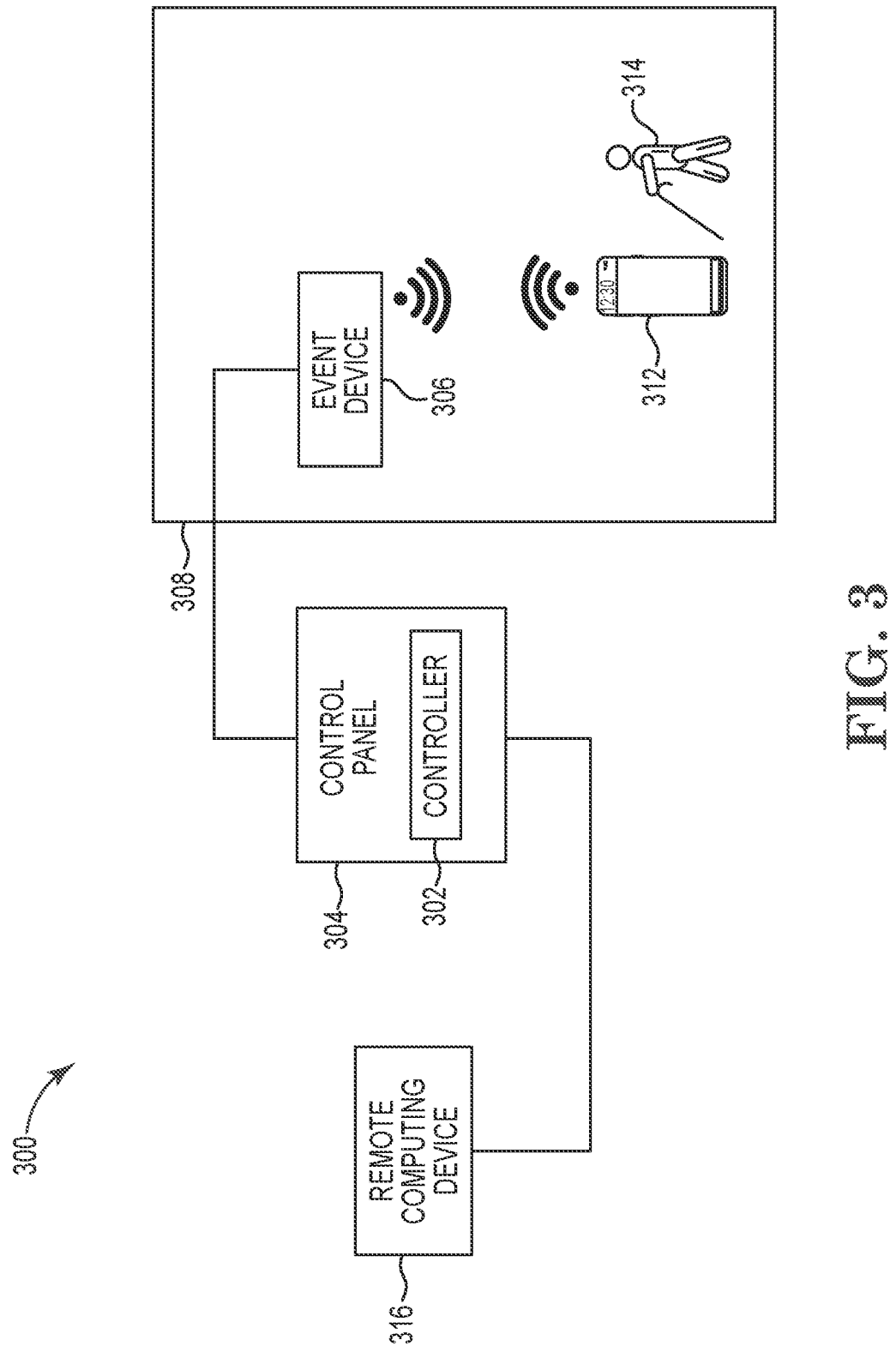
FIG. 3 is an example of transmitting evacuation data for system functionality settings based on a person of interest in an event detection system, in accordance with one or more embodiments of the present disclosure.

FIG. 3 is an example of transmitting evacuation data for system functionality settings based on a person of interest in an event detection system, in accordance with one or more embodiments of the present disclosure. The system 300 can include a controller 302, a control panel 304, an event device 306 located in a detection zone 308, mobile device 312, person of interest 314, and a remote computing device 316. The control panel 304 can be connected to the remote computing device 316 via a network relationship.

As previously described in connection with FIG. 1, the event device 306 can transmit evacuation data associated with the person of interest 314. For example, the mobile device 312 can transmit evacuation data to the event device 306, and the event device 306 can transmit the evacuation data to the controller 302. Such evacuation data can include identification information of the person of interest 314 (e.g., the person of interest's name, birthday, address, etc.), a disability of the person of interest 314 (e.g., the person of interest 314 is a vulnerable person who is a quadriplegic), and/or equipment that would assist in evacuation of the person of interest 314 (e.g., a wheelchair).

In some examples, the controller 302 can transmit the evacuation data associated with the person of interest 314 to a remote computing device 316. For example, the controller 302 can transmit evacuation data including identification information of the person of interest 314 (e.g., the person of interest's name, birthday, address, etc.), a disability of the person of interest 314 if they are determined to be a vulnerable person (e.g., the person of interest 314 is a quadriplegic), equipment that would assist in evacuation of the person of interest 314 (e.g., a wheelchair), and/or the location of the mobile device 312 associated with the person of interest 314 in the detection zone 308/the facility.

The remote computing device 316 can be a standalone computing device, a computing system, a cloud computing platform, etc. that is remotely located from the facility. The remote computing device 316 can be, for example, a computing device utilized by emergency services/first responders. In the event that emergency service personnel are dispatched to the facility, the emergency service personnel can be provided with the evacuation data associated with the person of interest 314 from the mobile device 312 to plan and prepare for evacuation of the person of interest 314, if necessary.

Figure 4:
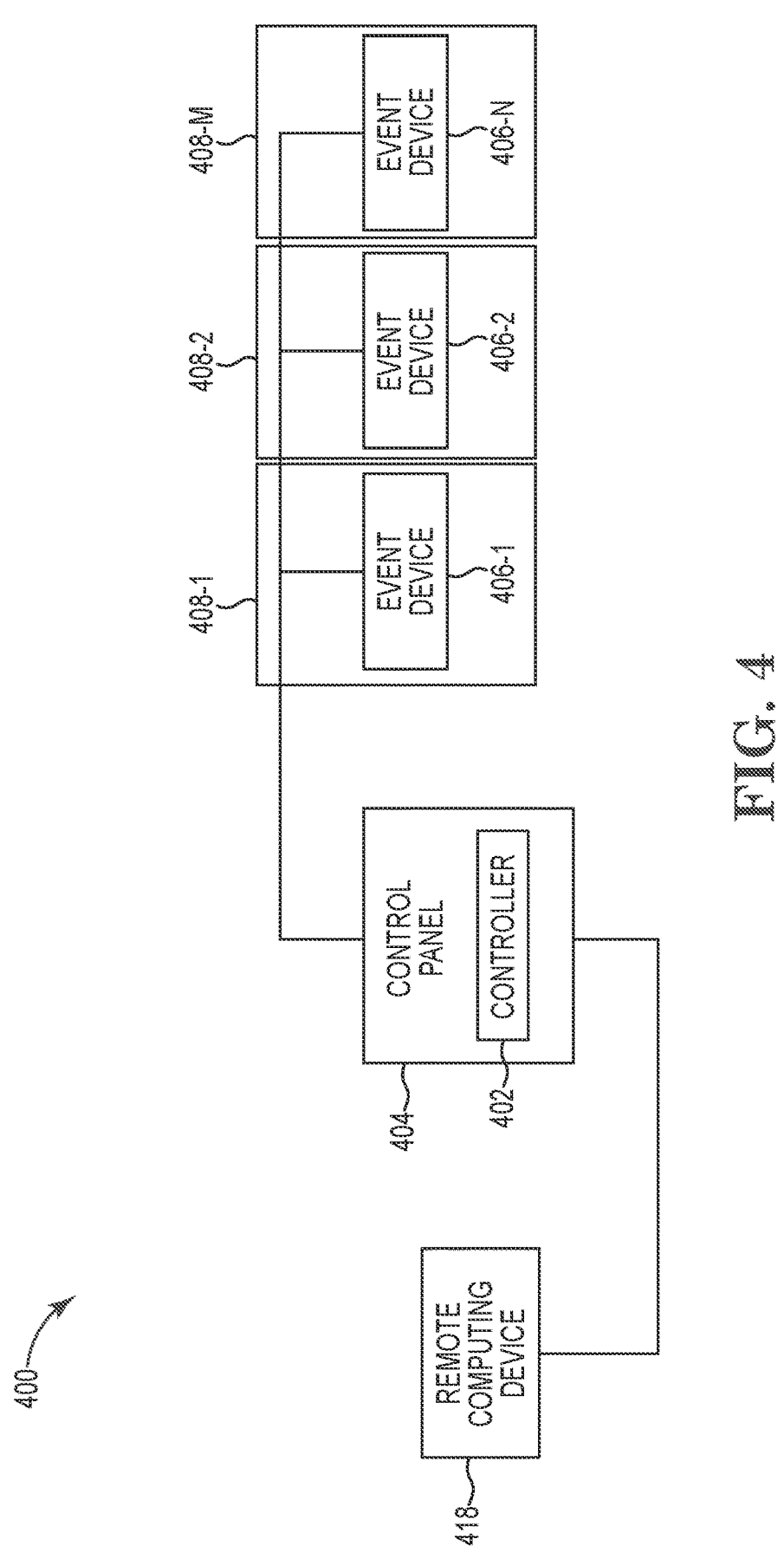
FIG. 4 is an example of a detection zone having a propensity of generating a false alarm for system functionality settings based on a person of interest in an event detection system, in accordance with one or more embodiments of the present disclosure.

FIG. 4 is an example of a detection zone having a propensity of generating a false alarm for system functionality settings based on a person of interest in an event detection system, in accordance with one or more embodiments of the present disclosure. The system 400 can include a controller 402, a control panel 404, event devices 406 located in respective detection zones 408, and a remote computing device 418. The control panel 404 can be connected to the remote computing device 418 via a network relationship.

The remote computing device 418 can receive pre-alarm data and alarm data from event devices 406-1, 406-2, 406-N located throughout different detection zones 408-1, 408-2, 408-M, respectively, in the facility. Pre-alarm data can include information relating to conditions which initiated pre-alarms for various events that are detected in the facility by the event devices 406-1, 406-2, 406-N, whereas alarm data can include information relating to conditions which initiated full alarms for various events that are detected in the facility by the event devices 406-1, 406-2, 406-N.

Utilizing the pre-alarm data and the alarm data, the remote computing device 418 can determine a detection zone 408 having a greater propensity of generating the false alarm than a remaining amount of detection zones 408. For example, based on the pre-alarm data and the alarm data, the remote computing device 418 can determine that the detection zone 408-1 has a greater propensity of event device 406-1 generating a false alarm than the event devices 406-2, 406-N of detection zones 408-2, 408-M, respectively. The event device 406-1 can have modified system functionality settings, including heightened alarm settings. The remote computing device 418 can utilize a machine learning algorithm to classify and/or categorize the pre-alarm data and the alarm data in order to determine the detection zone 408 having the greater propensity of generating the false alarm.

As such, the remote computing device 418 can generate a list of detection zones 408 (e.g., detection zones 408-2, 408-M) in which to locate a person of interest in the facility (as the list of detection zones excludes the detection zone 408-1 having the greater propensity of generating the false alarm). Further, the remote computing device 418 can select a detection zone 408-2, 408-M from the list of detection zones to locate a person of interest. For example, the remote computing device 418 can select the detection zone 408-2 as being the least likely (e.g., the lowest probability) of generating a false alarm. Such an approach can reduce nuisance alarms due to the increased sensitivity of event devices 406 when a person of interest is located in such a detection zone 408.

Figure 5:
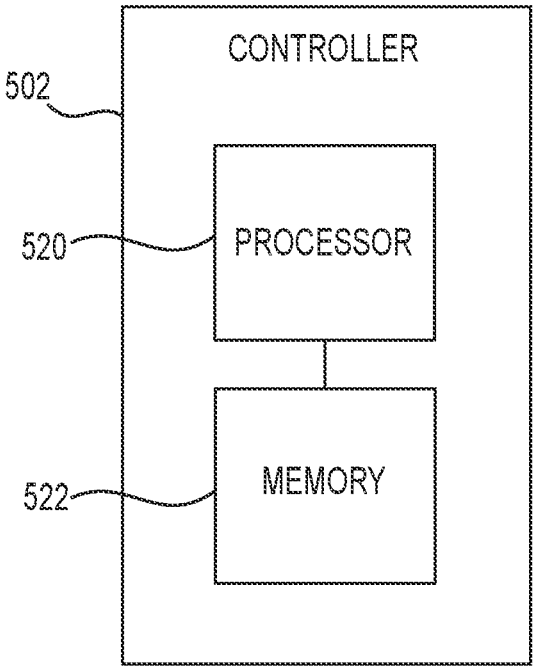
FIG. 5 is an example of a controller for system functionality settings based on a person of interest in an event detection system, in accordance with one or more embodiments of the present disclosure.

FIG. 5 is an example of a controller 502 for system functionality settings based on a person of interest in an event detection system, in accordance with one or more embodiments of the present disclosure. As illustrated in FIG. 5, the controller 502 can include a memory 522 and a processor 520 for system functionality settings based on a person of interest in an event detection system, in accordance with the present disclosure.

The memory 522 can be any type of storage medium that can be accessed by the processor 520 to perform various examples of the present disclosure. For example, the memory 522 can be a non-transitory computer readable medium having computer readable instructions (e.g., executable instructions/computer program instructions) stored thereon that are executable by the processor 520 for system functionality settings based on a person of interest in an event detection system in accordance with the present disclosure.

The memory 522 can be volatile or nonvolatile memory. The memory 522 can also be removable (e.g., portable) memory, or non-removable (e.g., internal) memory. For example, the memory 522 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 522 is illustrated as being located within controller 502, embodiments of the present disclosure are not so limited. For example, memory 522 can also be located internal to another computing resource (e.g., enabling computer readable instructions to be downloaded over the Internet or another wired or wireless connection).

The processor 520 may be a central processing unit (CPU), a semiconductor-based microprocessor, and/or other hardware devices suitable for retrieval and execution of machine-readable instructions stored in the memory 522.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A controller for system functionality settings based on a person of interest in an event detection system, comprising:

a memory; and a processor configured to execute executable instructions stored in the memory to:

receive a person of interest signal indicating a location of a person of interest in a facility, wherein the person of interest signal includes evacuation data associated with the person of interest; and in response to receiving the person of interest signal, modify a system functionality setting of an event device in a predefined detection zone in which the location of the person of interest is located based on an attribute included in a user profile included in the person of interest signal.

2. The controller of claim 1, wherein modifying the system functionality setting includes modifying a sensitivity level of the event device in the predefined detection zone.

3. The controller of claim 1, wherein modifying the system functionality setting includes removing a predefined time delay between detection of an event by the event device and transmitting an event detection signal by the event device to a control panel.

4. The controller of claim 1, wherein modifying the system functionality setting includes disabling coincidence detection settings with other event devices in the predefined detection zone.

5. The controller of claim 1, wherein modifying the system functionality setting includes toggling a mechanical action of an egress device in response to the person of interest being located in the predefined detection zone.

6. The controller of claim 1, wherein in response to receiving the person of interest signal, the processor is configured to execute the instructions to modify the system functionality setting of an event device located on an egress route from the predefined detection zone out of the facility based on the attribute included in the user profile.

7. The controller of claim 6, wherein the processor is configured to execute the instructions to modify, in response to receiving the person of interest signal, the system functionality setting of the event device located on the egress route.

8. The controller of claim 1, wherein the controller is located in a control panel of the event detection system.

9. A non-transitory computer readable medium having computer readable instructions stored thereon that are executable by a processor to:

receive a person of interest signal including a user profile having an attribute associated with the person of interest and evacuation data associated with the person of interest from an event device in a facility;

determine, based on the person of interest signal, a location of a mobile device associated with a person of interest in the facility; and modify, based on the attribute included in the user profile, a system functionality setting of an event device in a predefined detection zone in which the mobile device is located from standard alarm settings to heightened alarm settings.

10. The computer readable medium of claim 9, wherein modifying the system functionality setting includes increasing a sensitivity level of an event device by lowering a detection threshold such that the event device is to detect an event faster than the event device under the standard alarm settings.

11. The computer readable medium of claim 9, wherein the computer readable instructions are executable by the processor to generate an alarm in response to the event device detecting an event.

12. The computer readable medium of claim 11, wherein the computer readable instructions are executable by the processor to generate the alarm by at least one of:

generating a staff alarm;

generating a local alarm; and generating a full alarm.

13. The computer readable medium of claim 9, wherein the computer readable instructions are executable by the processor to receive, from the event device, a distress signal indicating the person of interest is in a distress condition, wherein the event device receives the distress signal from the mobile device associated with the person of interest.

14. The computer readable medium of claim 9, wherein the evacuation data associated with the person of interest includes at least one of:

identification information of the person of interest;

a disability of the person of interest; and equipment to assist in evacuation of the person of interest.

15. The computer readable medium of claim 9, wherein the computer readable instructions are executable by the processor to transmit the evacuation data associated with the person of interest to a remote computing device.

16. The computer readable medium of claim 9, wherein the computer readable instructions are executable by the processor to:

receive a further person of interest signal from a different event device in the facility;

determine, based on the further person of interest signal, a revised location of the mobile device, wherein the revised location of the mobile device is in a different predefined detection zone, wherein the predefined detection zone and the different predefined detection zones are ones of a plurality of predefined detection zones; and modify the system functionality setting of the event device from the heightened alarm settings to the standard alarm settings.

17. The computer readable medium of claim 9, wherein:

the person of interest signal is received at a particular rate; and the computer readable instructions are executable by the processor to modify the system functionality setting of the event device from the heightened alarm settings to the standard alarm settings in response to the particular rate indicating the mobile device is in the predefined detection zone for an amount of time that exceeds a threshold.

18. A method for system functionality settings based on a person of interest in an event detection system, comprising:

receiving, by a computing device, pre-alarm data and alarm data from event devices located in a plurality of predefined detection zones in a facility;

determining, by the computing device from the pre-alarm data and the alarm data, a detection zone of the plurality of predefined detection zones having a greater propensity of generating a false alarm than a remaining amount of detection zones of the plurality of predefined detection zones, wherein the detection zone having the greater propensity of generating the false alarm is a detection zone having an event device with a modified system functionality setting; and generating, by the computing device, a list of detection zones of the plurality of predefined detection zones to locate a person of interest in the facility, wherein the list of detection zones excludes the detection zone having the greater propensity of generating the false alarm.

19. The method of claim 18, wherein the method includes selecting a detection zone from the list of detection zones to locate the person of interest.

20. The method of claim 18, wherein the detection zone having the greater propensity of generating the false alarm is a detection zone having the event device with heightened alarm settings.

* * * * *